(12) United States Patent
Howard et al.

(10) Patent No.: US 10,740,421 B2
(45) Date of Patent: Aug. 11, 2020

(54) SYSTEM AND METHOD FOR ENHANCED SEARCH

(71) Applicants: Newton Howard, Providence, RI (US); Mustak Ibn Ayub, Oxford (GB)

(72) Inventors: Newton Howard, Providence, RI (US); Mustak Ibn Ayub, Oxford (GB)

(73) Assignee: Newton Howard, Providence, RI (US)

( * ) Notice: Subject to any disclaimer, the term of this patent is extended or adjusted under 35 U.S.C. 154(b) by 110 days.

(21) Appl. No.: 15/917,080

(22) Filed: Mar. 9, 2018

(65) Prior Publication Data

US 2018/0260486 A1 Sep. 13, 2018

Related U.S. Application Data

(60) Provisional application No. 62/469,171, filed on Mar. 9, 2017.

(51) Int. Cl.
*G06F 16/9535* (2019.01)
*G06F 16/2457* (2019.01)

(52) U.S. Cl.
CPC .... *G06F 16/9535* (2019.01); *G06F 16/24575* (2019.01); *G06F 16/24578* (2019.01)

(58) Field of Classification Search
CPC .......... G06F 16/9535; G06F 16/24575; G06F 16/24578
See application file for complete search history.

(56) References Cited

U.S. PATENT DOCUMENTS

2008/0005068 A1* 1/2008 Dumais ............. G06F 16/24575
2013/0041896 A1* 2/2013 Ghani ................. G06F 16/334
707/732

* cited by examiner

*Primary Examiner* — Apu M Mofiz
*Assistant Examiner* — Husam Turki Samara
(74) *Attorney, Agent, or Firm* — Smith, Gambrell & Russell, LLP.

(57) ABSTRACT

Embodiments of the present systems and methods may provide a fundamentally different approach to process the 'search key words' from users. For example, the process may progress through a series of steps that will understand 'WHY' a user is looking for the information instead of just 'WHAT' the user is searching. This will give the present techniques a very different way to look for the information and generate the search outputs. For example, a method may provide search results to a user of a computing device, the method may comprise receiving at least one search term from the user via the computing device, collecting information relating to the user other than the at least one search term, and providing search results to the user via the computing device based on the search term and on the collected information relating to the user.

15 Claims, 7 Drawing Sheets

Fig. 4

Music

| ID | Title | Artist | Genre | Year | Personality | Mood | Techniques (RAS) |
|----|-------|--------|-------|------|-------------|------|------------------|
| 1 | You are not alone | Michael Jackson | Pop | 1995 | Conscientious | Sad | Reappraise (7) |
| 2 | Nothing else matter | Metallica | Rock | 1991 | Extravert | Sad | Reappraise (8) |
| 3 | When I fall in love | Nat King Cole | Jazz | 1956 | Open | Angry | Suppress (5) |
| 4 | Try | Pink | Pop | 2012 | Agreeable | Sad | Stimulate (9) |
| 5 | Little talks | Of Monster and Men | Pop | 2011 | Open | Sad | Attention deployment (6) |
| 6 | What a wonderful world | Louis Armstrong | Jazz | 1967 | Agreeable | Stress | Reappraise (8) |

SYSTEM AND METHOD FOR ENHANCED SEARCH

CROSS-REFERENCE TO RELATED APPLICATIONS

This application claims the benefit of U.S. Provisional Patent Application No. 62/469,171, filed on Mar. 9, 2017, which is incorporated herein by reference in its entirety.

BACKGROUND

The present invention relates to techniques for performing more customized and precise searches of data, such as on the Internet.

Data size on the Internet has soared in recent years, especially after the proliferation of platforms that promote 'user generated content,' which are often unsupervised and get shared across numerous platforms. Due to this enormous data deluge, finding useful content from the Internet is more challenging than ever before. The most popular search engines (Google, Yahoo, Bing) find millions of search results for every key word, but, except for the results from the first few pages, hardly any of these results are explored and used. Unless something is virally shared, high quality content may remain underappreciated just because it was not ranked by conventional processes. That is one reason why it is still challenging to find useful content on the Internet with ease and objectivity. In spite of notable progress, existing search processes have failed to evolve fast enough to understand the requirements of the users and to save search time by providing useful search outcomes.

A need arises for search techniques that more customized and precise searches of data, and thus, more particularly useful results.

SUMMARY

Embodiments of the present systems and methods may provide an empathetic search process which will provide more customized and precise search results to the users. In an embodiment features of human psychology (HP) may be combined with artificial intelligence (AI) to create a process that will be aware about the users and their search motives and apply this information to provide search results that will be more precise, but dynamic, to meet the needs of the users.

In embodiments, the present techniques may have fundamentally different approach to process the 'search key words' from users. For example, the process may progress through a series of steps that will understand 'WHY' a user is looking for the information instead of just 'WHAT' the user is searching. This will give the present techniques a very different way to look for the information and generate the search outputs.

For example, a method may provide search results to a user of a computing device, the method may comprise receiving at least one search term from the user via the computing device, collecting information relating to the user other than the at least one search term, and providing search results to the user via the computing device based on the search term and on the collected information relating to the user.

In embodiments, the information relating to the user may comprise at least one of the user's location, the user's mental/physical status, the user's occupation, the user's passions, the user's hobbies, the user's academic background, the user's ethnicity. The information relating to the user may be collected from at least one of the computing device of the user, from social media systems, from public or private databases, from a browsing history of the user, from email messages of the user, and from text messages of the user. Providing search results may further comprise ranking each search result webpage based on attributes of content of each webpage and attributes of the user determined from the collected information relating to the user. The method of may further comprise updating the search result webpages and the ranking of the search result webpages when attributes of the user determined from the collected information relating to the user change. The method of may further comprise updating the search result webpages and the ranking of the search result webpages based on user interaction with the search results.

BRIEF DESCRIPTION OF THE DRAWINGS

The details of the present invention, both as to its structure and operation, can best be understood by referring to the accompanying drawings, in which like reference numbers and designations refer to like elements.

FIG. 4 is an exemplary illustration of data that may be utilized by the present embodiments.

DETAILED DESCRIPTION

Figure 1:
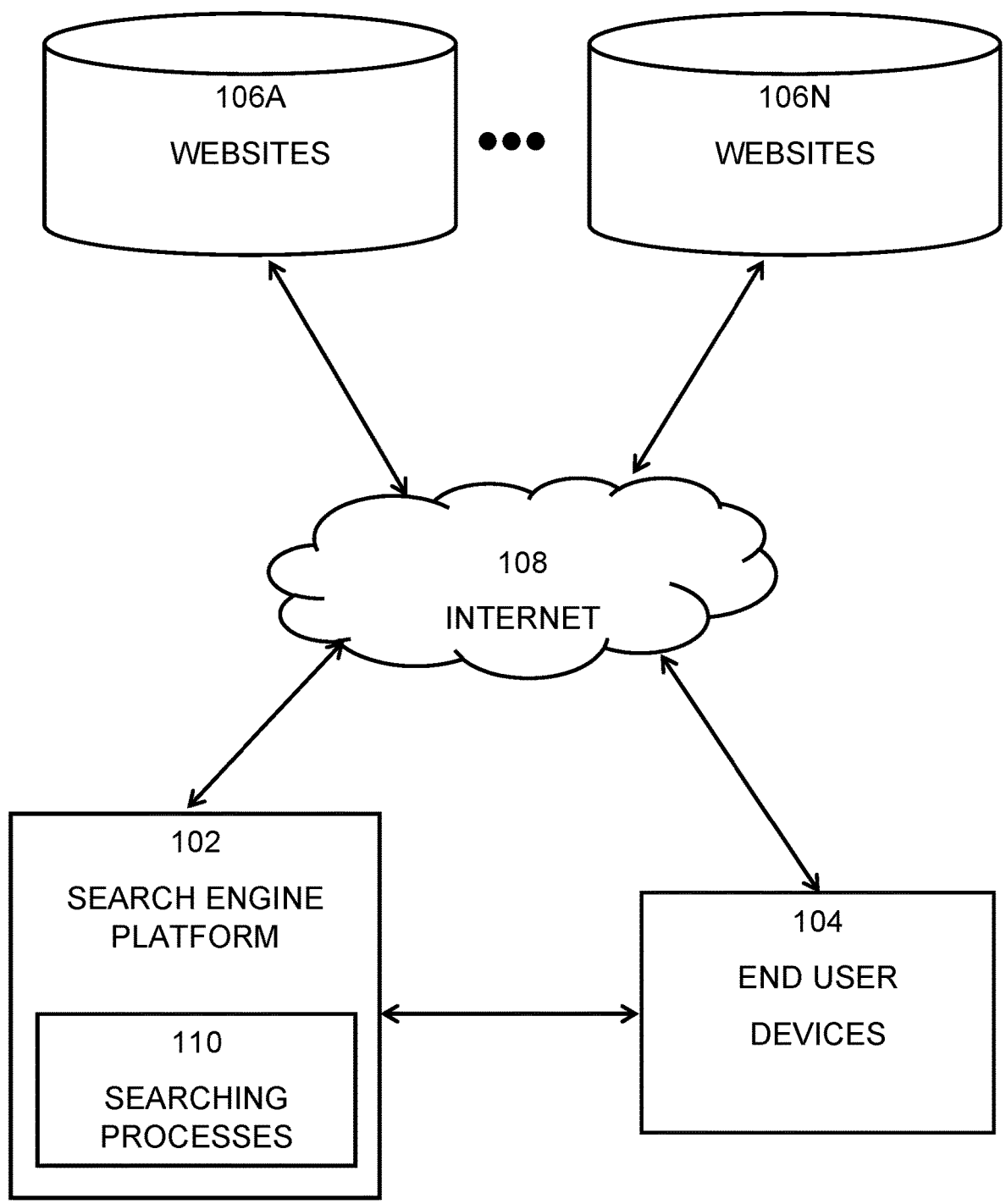
FIG. 1 illustrates a system in which described embodiments may be implemented.

Embodiments of the present systems and methods may provide an empathetic search process which will provide more customized and precise search results to the users. In an embodiment features of human psychology (HP) may be combined with artificial intelligence (AI) to create a process that will be aware about the users and their search motives and apply this information to provide search results that will be more precise, but dynamic, to meet the needs of the users.

In embodiments, the present techniques may have fundamentally different approach to process the 'search key words' from users. For example, the process may progress through a series of steps that will understand 'WHY' a user is looking for the information instead of just 'WHAT' the user is searching. This will give the present techniques a very different way to look for the information and generate the search outputs.

For example, a real-world scenario may help to illustrate this point. In this example, a customer 'X' needed a cable to transfer image data from his camera. He entered a shop which sold computers, cameras and related accessories and started to look for a camera cable. A salesman approached him and asked what he was looking for. The customer showed the camera and said that he was looking for a cable that will allow him to transfer the data from the camera to his computer. The salesman very quickly said that the store did not sell that item. However, anxious to help the customer, the salesman gave the customer' a computer-printed KNOW HOW page and showed the customer how he could find and order the cable from the online store. Customer X appreciated the effort of the salesman. He thanked him, left the store and immediately threw the KNOW HOW page in the trash. Those instructions were absolutely useless in his context of the search for the cable. X needed to transfer the image data on the same day and as soon as possible. He could not wait for tomorrow. As a result, the time the salesman spent time on him was a waste for both of them.

However, this wastage could have been avoided if only the salesman asked why X was looking for the cable, namely that he needed to transfer the images on that day. It was the not the cable that was crucial here. Rather 'an immediate transfer of the images from the camera' was the need in this particular case. The salesman's help could have been useful if i) X's actual need was to buy the cable and/or ii) he could wait for more than one day to allow the cable arrive from online store. Both of these objectives could have been achieved if the salesman had simply asked WHY X was looking for the cable. Then he would have realized that X wanted to transfer the images (which is an immediate need) and not that he was actually looking to buy a cable. Understanding this 'need' could change the whole approach of dealing with the search for the cable and the experience of the salesman and his customer could have been completely different.

It is fundamental to recognize in this scenario that though the search item was a camera cable, the reason for the search was actually the 'need to transfer the images' from the camera. This macroworld case story also suggests that the purpose of a 'search' can be presumed from the intended use of the search items. In other words, the intended use of a searched item can partly fulfill the 'WHY' component of any 'search' term. But there are other considerations which can help form a precise guess of the 'WHY' and it is possible to construct a matrix comprising the various considerations together.

When we search for information, even though we input key words indicating 'WHAT', we are actually looking for the answer WHY, as has been pointed out in the above example. For example, example—when a user W asks a question like 'WHAT is a potato?' it may appear that the user is merely asking for information about the 'potato'. However, some considerations about the user may reveal the reason behind this question. For example, some reasons for this search may be—'W' may be a student and asking for an academic answer, 'W' may be a beginner cook and is asking this question to know about information about potato as a vegetable, 'W' may be a farmer and is asking to know about the of potato as a cultivated variety, etc. These examples highlight that the reasons for searching a term depend greatly on the user.

In conventional search algorithms, these reasons are not actively sought and thus ignore the most important clue to providing the most appropriate output for a search term. Once we try to understand the 'WHY' (causes) of a search term, we shall be able to get rid of many useless answers. It will save computational time and processing and most importantly, give more precise search results as this approach will ignore the irrelevant pages and sources. Determining the 'WHY' part of any search term may be challenging. However, even just considering a few cues may improve the search outcomes.

In an embodiment of an enhanced searching process, the 'maximum attainable set of cues' (MASCs) may be obtained to guess the WHY part for a search item, without making the process too complex.

An exemplary system for accepting searches and providing search results on the Internet is shown in FIG. 1. The system of FIG. 1 includes, but is not limited to, search engine platform 102, end user devices 104, websites 106A-N, such as commerce websites, news websites, social media websites, etc., all of which may be coupled together over a communications network, such as the Internet 108. Search engine platform 102 typically includes, but is not limited to, a CPU, memory, network interface and computer program instructions stored in memory and executed by the CPU to implement the searching processes described herein. The end user devices 104 may include devices such as personal computers, workstations, tablet computers, smartphones, etc., that implement one or more standard browsing platforms to issue requests for the search engine platform 102 to perform the Internet searches.

Figure 2:
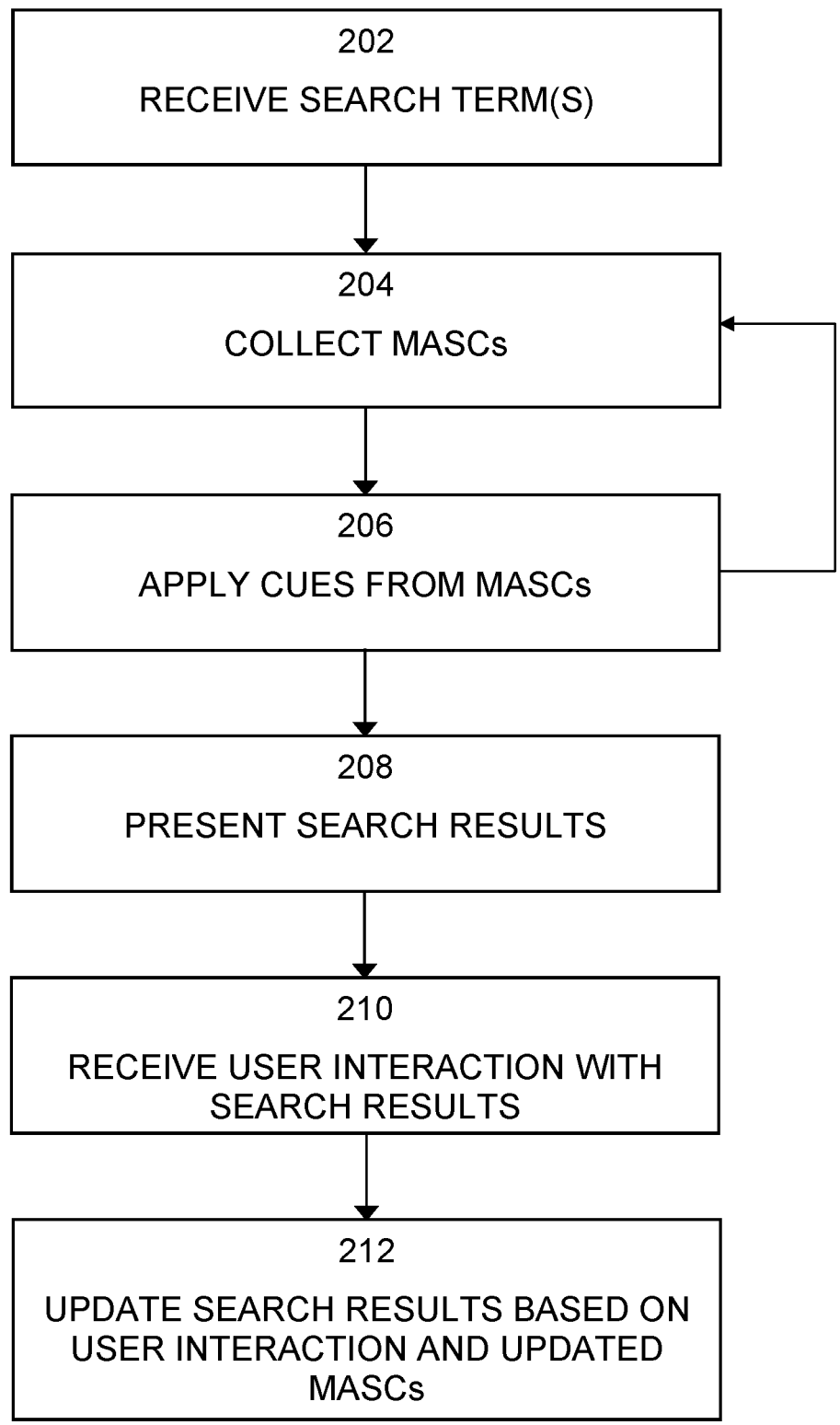
FIG. 2 is an exemplary data flow diagram of processes 200 involved in the present embodiments.

An exemplary data flow diagram of processes 200 of searching according to the present embodiments is shown in FIG. 2. The present processes may search and present information based on the 'WHY' attributes (rather than just the WHAT attributes), which may be predicted based on the User and the Search they are making in order to provide search results that are personalized. The same search key word may give different outputs to different users. Process 200 begins with 202, in which a search term or terms may be received from a user.

The WHY part may be guessed by considering the context of a search and may depend on cues about the user. The more cues that are included, more precise the present process will become to return the search results. However, including too many cues may be exhaustive and so the approach will be to find the MASCs that will allow guessing the reason(s) for searching something by a user. At 204, the MASCs to be used may be collected. The MASCs for a user may include, but are not limited to, information relating to the user, such as the user's location, the user's mental/physical status, the user's occupation, the user's passions, the user's hobbies, the user's academic background, the user's ethnicity, etc. This list may be dynamic and may change case by case. However, including just a few of the cues may give better results than the current approach for generating the search outputs. For example, if a user is in Oxford (this information may be extracted in real time) and is searching the Internet by giving just one word 'Oxford' as the input, the 'reasons' can be many (which is the WHY part of this single key word "Oxford"). For example, the user may be looking for tourist attractions in Oxford, the user may be looking for the history of Oxford, the user may be looking for Oxford University, the user may be looking for geophysical information about Oxford, the user may be looking for travel information to (and from) Oxford, etc. MASCs that may be collected about the user may include the user is in Oxford (extracted from the GPS of his/her device), the user is a student in Oxford University (Extracted from social media or public databases).

At 206, cues from the collected MASCs may be applied. Using the present example, just based on the MASCs that the user in in Oxford and is s student at Oxford University, the MASCs may be applied by giving values to the possible reasons for the search. For example, from 1 to 10, with 10 the highest:

1. The user is looking for attractions in Oxford-3 (Only if the user is new in oxford, may be)
2. The user is looking for history of Oxford-5 (If the user is new and trying to know more about Oxford)
3. The user is looking for Oxford University-1 (The user knows where the Oxford University is, but if the user is trying to get into Oxford University's website by just writing Oxford—then give 8)

4. The user is looking for geophysical location-6 (Probably trying to study more about Oxford's place in the UK and the world)

5. The user is looking for travel information to Oxford-2 (He/she most probably already knows it).

As this may not sufficiently distinguish among the relevant cases, 204 and 206 may be repeated. For example, at 204, additional MASCs may be collected that indicate that the user is studying in Oxford, that his/her passion is knowing the historical background of a place, and that the user has moved to Oxford very recently (can be guessed from the year of enrollment in the University of Oxford). Then at 206, cues from the collected MASCs may be applied. Using the present example, the values may be reassigned to the possible reasons for the search:

1. The user is looking for attractions in Oxford-6 (Probably, preparing a list of interesting things in the new place).

2. The user is looking for the history of Oxford-8 (Probably, trying to learn more about the new city where he/she has moved in)

3. The user is looking for Oxford University-1 (Already knows where Oxford University is)

4. The user is looking for Oxford's geo-physical location-2 (Probably already knows)

5. The user is looking for travel information to Oxford-2 (Probably already knows)

The repetition of 204 and 206 may continue, as the more information about the user that can be added in the MASCs, the clearer the purpose of the search key word 'Oxford' can become. Theoretically, if the MASCs can provide unlimited information about the user, it will be possible to precisely guess the reason of the search and in that the output list will be the narrowest, yet the information will be most relevant to the user. However, in practice, the MASCs will be limited. Accordingly, at 208, search results may be presented to the user. At 210, the user may interact with the search results, for example, by clicking on one or more result listings. This interaction may be received and, at 212, the search results may be updated and so the result may be dynamic and continuously learned from the user's interaction with the output list.

The rank of the pages populated for a user in an output list may be dependent on the content pages of the Internet. The following equation describes the relationship:

$$R_{1 \to \infty} f[CAS(P_1 \to P_\infty)]$$

Here, $R_{1 \to \infty}$ is the ranks of all pages ($P_1 \to P_\infty$) that contain the relevant search information for the particular user, CAS is the Contents Attribute Score, and $$(P1 \to P\infty) = \begin{bmatrix} P1 & = E_{1 \to 10} & \ldots & T_{1 \to 10} \\ \vdots & \vdots & & \vdots \\ P\infty & = E_{1 \to 10} & \ldots & T_{1 \to 10} \end{bmatrix}$$

Here, E . . . T indicates the RAS (Rationale Assumption Score), which are assigned based on EREmPT qualities of any content as below:

$$(E_{1 \to 10} \ldots T_{1 \to 10}) = \begin{bmatrix} E(ducation): 1 \ldots 10 \\ R(ecreational): 1 \ldots 10 \\ Em(otional): 1 \ldots 10 \\ P(ractical): 1 \ldots 10 \\ T(echnical): 1 \ldots 10 \\ \vdots \end{bmatrix}$$

A Rationale Assumption Score (RAS) based on the EREmPT of the web contents in the WWW will dynamically respond to the MASCs of a user:

$$RAS \leftrightarrow MASCs, \text{ where } MASCs = \begin{bmatrix} 1 = \text{Profession} \\ 2 = \text{Passion} \\ 3 = \text{Education} \\ 4 = \text{Hobby} \\ 5 = \text{Ethnicity} \\ 6 = \text{Location} \end{bmatrix}$$

Figure 3:
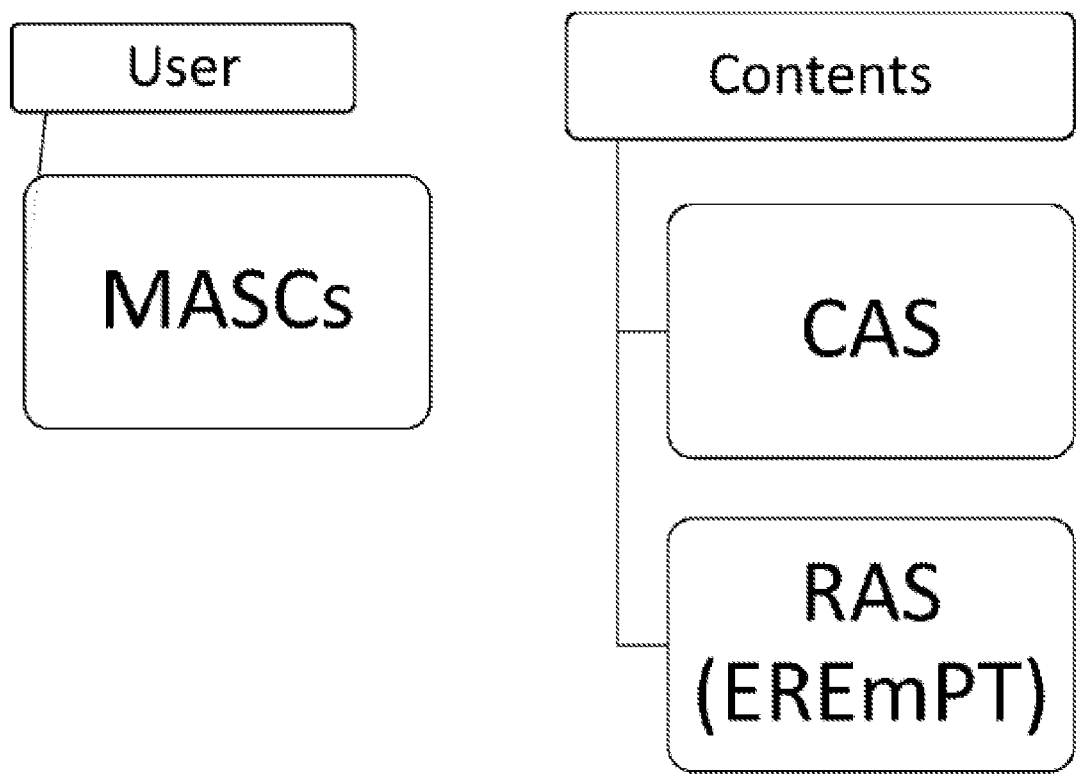
FIG. 3 is an exemplary data flow diagram of data that may be utilized by the present embodiments.

Examples of MASCs (of user) and/or CAS & RAS (of contents) are shown in FIG. 3.

An example of using an embodiment of the present processes to provide personalized search results is shown in FIG. 4. Based on the user information and CAS and RAS of web contents, suggested output can be personalized. For example, an application may provide Internet contents to meet users' emotional needs. On many occasions users retrieve contents from the Internet to deal with their negative emotions such as: sadness, anxiety, demotivation, anger and stress. In this example, the embodiment may interact with Internet such as video, image, music, news, exercise/activity and comic/fun and then assign these contents RAS values based on their ability to invoke any of the basic four emotion regulation responses, such as—suppression, reappraisal, motivation and attention deployment.

Other elements of the CAS may be the name of the artist/producer, year, genre and so on. Examples of attributes to assign CAS to music contents in the Internet is shown in FIG. 4. At the user end, the application may consider the following MASCs: Personality, Input mood status, Location, Language, Number of close friends, etc. When a user looks for contents from the Internet, the above MASCs of the user may be matched with CAS of internet contents and presented to the user as an output list. The list may be dynamically updated based on the interactions of the user with the output list.

Figure 5:
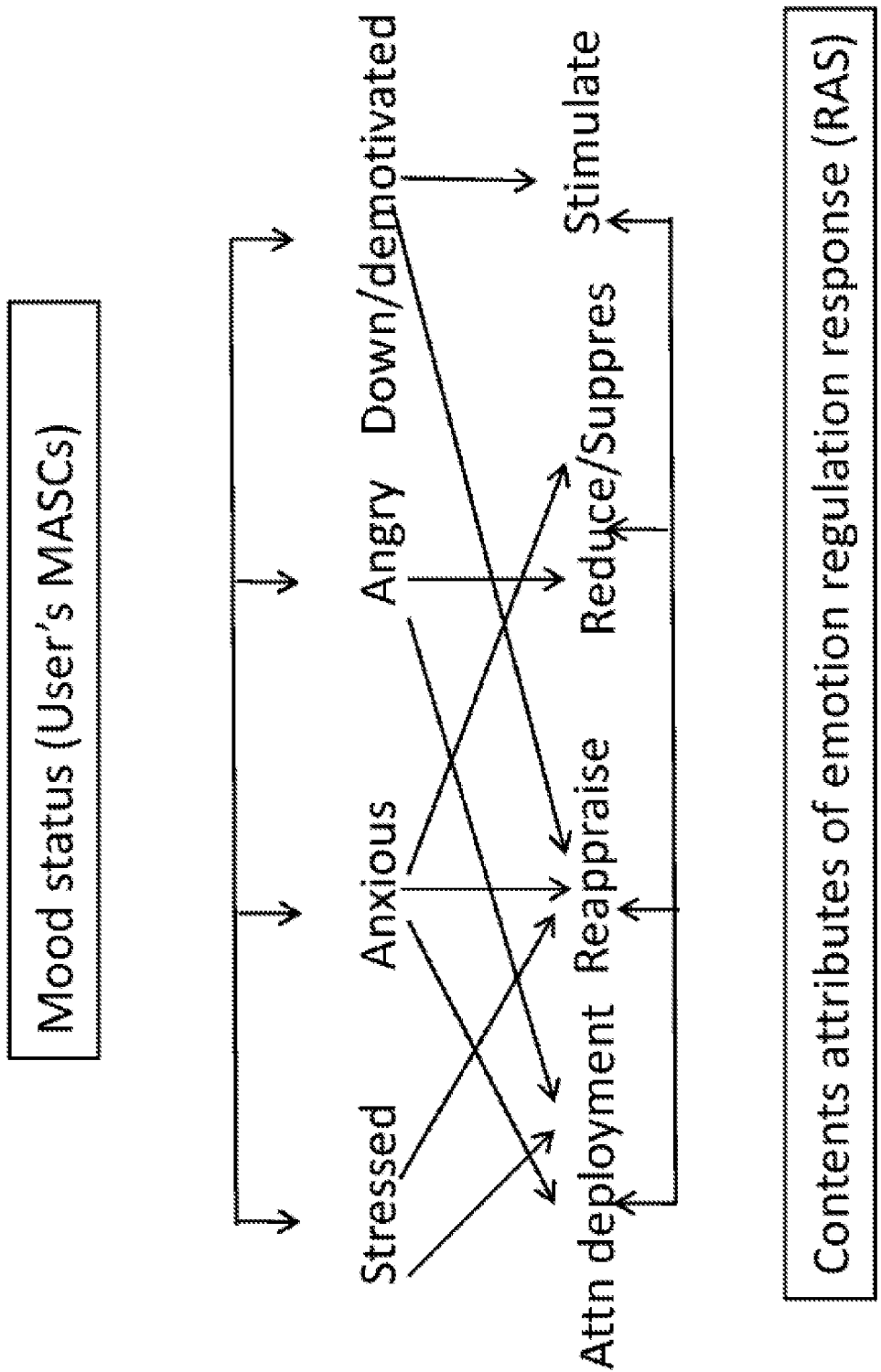
FIG. 5 is an exemplary illustration of relations among data that may be utilized by the present embodiments.

An example of connections of the MASCs and CAS in the application showing the relations between the contents' RAS and the user's MASCs is shown in FIG. 5. The application may connect human personality and emotions to a broad range of Internet contents and provide them as a personalized package. Suggested contents may continuously updated based on user interaction with the results by modulating the CAS of the contents and MASCs of the users.

Figure 6:
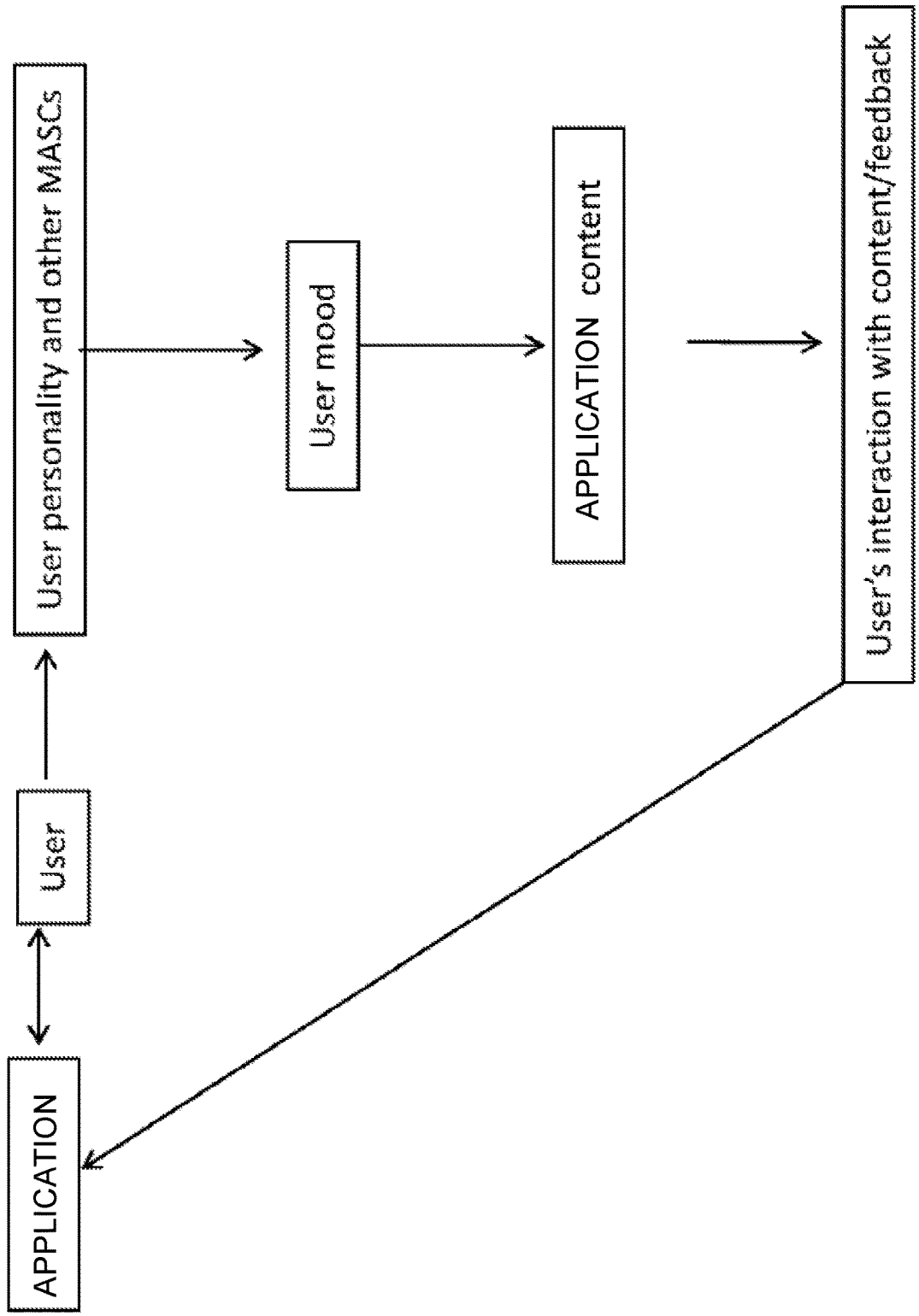
FIG. 6 is an exemplary flow diagram of processes involved in the present embodiments.

An example of the feedback between user-content-interaction and the application is shown in FIG. 6. After evaluating user response to suggested contents, the application may update/change its suggestions and/or search results during further iterations.

Figure 7:
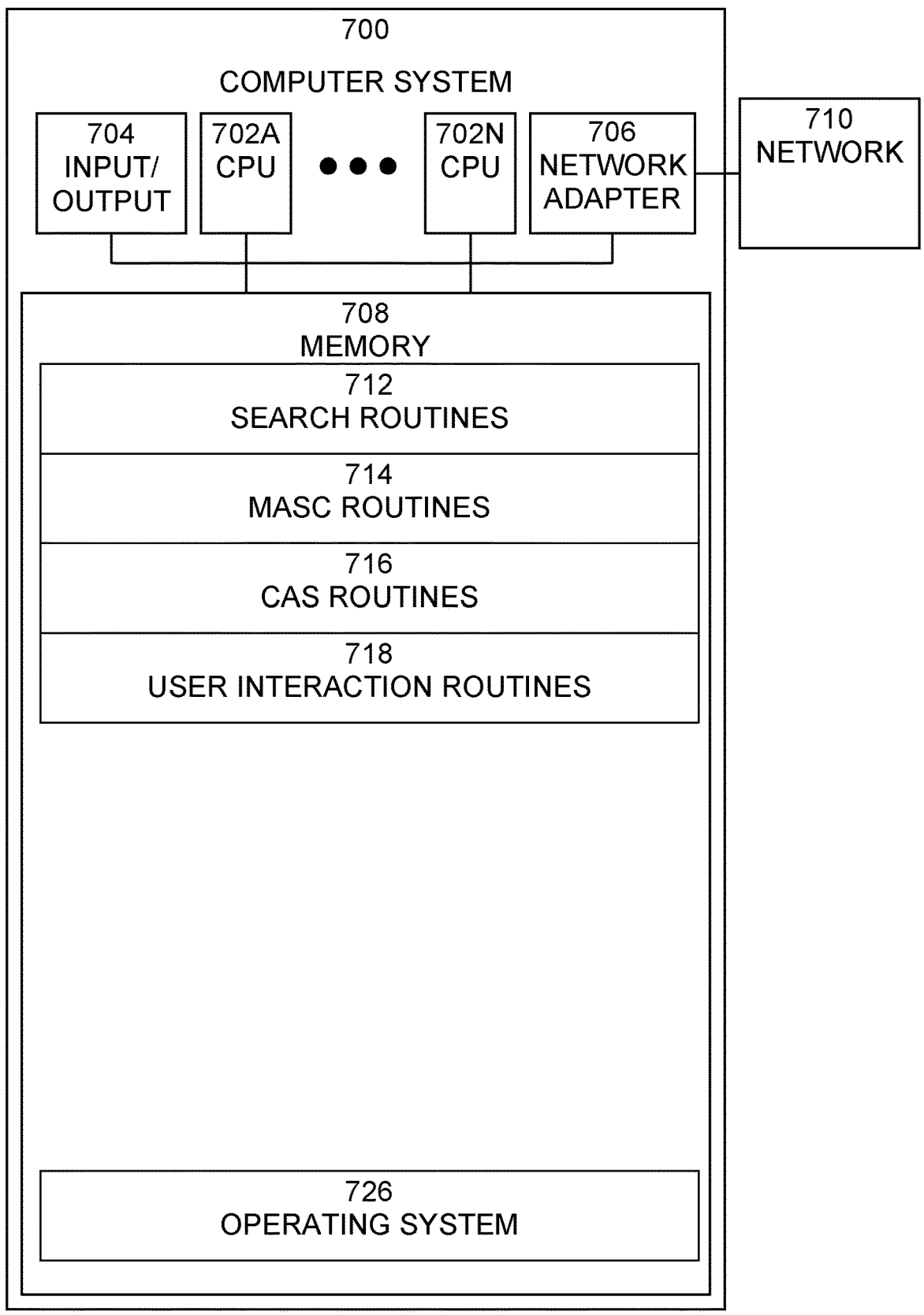
FIG. 7 is an exemplary block diagram of a computer system in which processes involved in the embodiments described herein may be implemented.

An exemplary block diagram of a computer system 702, in which processes involved in the embodiments described herein may be implemented, is shown in FIG. 7. Computer system 702 may be implemented using one or more programmed general-purpose computer systems, such as embedded processors, systems on a chip, personal computers, workstations, server systems, and minicomputers or mainframe computers, or in distributed, networked computing environments. Computer system 702 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 702 is implemented as a single multi-processor computer system, in which multiple processors 702A-702N share system resources, such as memory 708, input/output circuitry 704, and network adapter 706. However, the present communications systems and methods also include embodiments in which computer system 702 is implemented as a plurality of networked computer systems, which may be single-processor computer systems, multi-processor computer systems, or a mix thereof.

Input/output circuitry 704 provides the capability to input data to, or output data from, computer system 702. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 702. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 702 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 7 may be implemented on a current leader server. Likewise, in embodiments, at least a portion of the software shown in FIG. 7 may be implemented on a computer system other than the current leader server.

In the example shown in FIG. 7, memory 708 may include search routines 712, MASC routines 714, CAS routines 716, user interaction routines, and operating system 720. Search routines 712 may include software routines to perform the customized and personalized search operations described above. MASC routines 714 may include software routines to collect MASC data and to apply cues based on that MASC data. CAS routines 716 may include software routines to gather CAS data and to apply that relative to MASC data. User interaction routines 718 may include software routines to receive user input and to update and/or modify search results based on user input. Operating system 720 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for providing search results to a user of a computing device, the method comprising:

receiving at least one search term from the user via the computing device;

collecting information relating to the user other than the at least one search term;

determining information relating to why the user is conducting the search using a maximum attainable set of cues (MASC) derived from the collected information relating to the user;

providing search results to the user via the computing device based on the search term, on the collected MASC information relating to the user, and on attributes of content of the search results that on match the MASC information, wherein the search results comprise a plurality of webpages that are ranked based on a score of attributes of content (CAS) of each webpage according to $R_{1\to\infty} = \int CAS(P_1 \to P_\infty)$, wherein $R_{1\to\infty}$ is the ranks of all pages ($P_1 \to P_\infty$) that contain search results information for the user, wherein the pages $(P_1 \rightarrow P_\infty)$ are scored according to:

$$(P_1 \rightarrow P_\infty) = \begin{bmatrix} P_1 & = E_{1 \rightarrow 10} & \ldots & T_{1 \rightarrow 10} \\ \vdots & \vdots & & \vdots \\ P_\infty & E_{1 \rightarrow 10} & \ldots & T_{1 \rightarrow 10} \end{bmatrix},$$

and E . . . T are qualities of contents according to:

$$(E_{1 \rightarrow 10} \ldots T_{1 \rightarrow 10}) = \begin{bmatrix} E(ducation): 1 \ldots 10 \\ R(ecreation): 1 \ldots 10 \\ Em(otional): 1 \ldots 10 \\ P(ractical): 1 \ldots 10 \\ T(echnical): 1 \ldots 10 \end{bmatrix},$$

and the $$MASC = \begin{bmatrix} 1 = Profession \\ 2 = Passion \\ 3 = Education \\ 4 = Hobby \\ 5 = Ethnicity \\ 6 = Location \end{bmatrix}.$$

2. A system for providing search results to a user of a computing device, the system comprising a processor, memory accessible by the processor, and computer program instructions stored in the memory and executable by the processor to perform:

receiving at least one search term from the user via the computing device;

collecting information relating to the user other than the at least one search term;

determining information relating to why the user is conducting the search using a maximum attainable set of cues (MASC) derived from the collected information relating to the user;

providing search results to the user via the computing device based on the search term, on the collected MASC information relating to the user, and on attributes of content of the search results that on match the MASC information, wherein the search results comprise a plurality of webpages that are ranked based on a score of attributes of content (CAS) of each webpage according to $R_{1 \rightarrow \infty} = \int CAS(P_1 \rightarrow P_\infty)$, wherein $R_{1 \rightarrow \infty}$ is the ranks of all pages $(P_1 \rightarrow P_\infty)$ that contain search results information for the user, wherein the pages $(P_1 \rightarrow P_\infty)$ are scored according to:

$$(P_1 \rightarrow P_\infty) = \begin{bmatrix} P_1 & = E_{1 \rightarrow 10} & \ldots & T_{1 \rightarrow 10} \\ \vdots & \vdots & & \vdots \\ P_\infty & E_{1 \rightarrow 10} & \ldots & T_{1 \rightarrow 10} \end{bmatrix},$$

and E . . . T are qualities of contents according to:

$$(E_{1 \rightarrow 10} \ldots T_{1 \rightarrow 10}) = \begin{bmatrix} E(ducation): 1 \ldots 10 \\ R(ecreation): 1 \ldots 10 \\ Em(otional): 1 \ldots 10 \\ P(ractical): 1 \ldots 10 \\ T(echnical): 1 \ldots 10 \end{bmatrix},$$

and the $$MASC = \begin{bmatrix} 1 = Profession \\ 2 = Passion \\ 3 = Education \\ 4 = Hobby \\ 5 = Ethnicity \\ 6 = Location \end{bmatrix}.$$

3. A computer program product for providing search results to a user of a computing device, the computer program product comprising a non-transitory computer readable storage having program instructions embodied therewith, the program instructions executable by a computer, to cause the computer to perform a method comprising:

receiving at least one search term from the user via the computing device;

collecting information relating to the user other than the at least one search term;

determining information relating to why the user is conducting the search using a maximum attainable set of cues (MASC) derived from the collected information relating to the user;

providing search results to the user via the computing device based on the search term, on the collected MASC information relating to the user, and on attributes of content of the search results that on match the MASC information, wherein the search results comprise a plurality of webpages that are ranked based on a score of attributes of content (CAS) of each webpage according to $R_{1 \rightarrow \infty} = \int CAS(P_1 \rightarrow P_\infty)$, wherein $R_{1 \rightarrow \infty}$ is the ranks of all pages $(P_1 \rightarrow P_\infty)$ that contain search results information for the user, wherein the pages $(P_1 \rightarrow P_\infty)$ are scored according to:

$$(P_1 \rightarrow P_\infty) = \begin{bmatrix} P_1 & = E_{1 \rightarrow 10} & \ldots & T_{1 \rightarrow 10} \\ \vdots & \vdots & & \vdots \\ P_\infty & E_{1 \rightarrow 10} & \ldots & T_{1 \rightarrow 10} \end{bmatrix},$$

and E . . . T are qualities of contents according to:

$$(E_{1 \rightarrow 10} \ldots T_{1 \rightarrow 10}) = \begin{bmatrix} E(ducation): 1 \ldots 10 \\ R(ecreation): 1 \ldots 10 \\ Em(otional): 1 \ldots 10 \\ P(ractical): 1 \ldots 10 \\ T(echnical): 1 \ldots 10 \end{bmatrix},$$

and the $$MASC = \begin{bmatrix} 1 = Profession \\ 2 = Passion \\ 3 = Education \\ 4 = Hobby \\ 5 = Ethnicity \\ 6 = Location \end{bmatrix}.$$

4. The method of claim 1, wherein the information relating to the user comprises at least one of the user's location, the user's mental/physical status, the user's occupation, the user's passions, the user's hobbies, the user's academic background, the user's ethnicity.

5. The method of claim 1, wherein the information relating to the user is collected from at least one of the computing device of the user, from social media systems, from public or private databases, from a browsing history of the user, from email messages of the user, and from text messages of the user.

6. The method of claim 1, further comprising:
updating the search result webpages and the ranking of the search result webpages when attributes of the user determined from the collected information relating to the user change.

7. The method of claim 1, further comprising:
updating the search result webpages and the ranking of the search result web pages based on user interaction with the search results.

8. The system of claim 2, wherein the information relating to the user comprises at least one of the user's location, the user's mental/physical status, the user's occupation, the user's passions, the user's hobbies, the user's academic background, the user's ethnicity.

9. The system of claim 2, wherein the information relating to the user is collected from at least one of the computing device of the user, from social media systems, from public or private databases, from a browsing history of the user, from email messages of the user, and from text messages of the user.

10. The system of claim 2, further comprising:
updating the search result webpages and the ranking of the search result webpages when attributes of the user determined from the collected information relating to the user change.

11. The system of claim 2, further comprising:
updating the search result web pages and the ranking of the search result web pages based on user interaction with the search results.

12. The computer program product of claim 3, wherein the information relating to the user comprises at least one of the user's location, the user's mental/physical status, the user's occupation, the user's passions, the user's hobbies, the user's academic background, the user's ethnicity.

13. The computer program product of claim 3, wherein the information relating to the user is collected from at least one of the computing device of the user, from social media systems, from public or private databases, from a browsing history of the user, from email messages of the user, and from text messages of the user.

14. The method of claim 3, further comprising:
updating the search result webpages and the ranking of the search result webpages when attributes of the user determined from the collected information relating to the user change.

15. The method of claim 3, further comprising:
updating the search result webpages and the ranking of the search result web pages based on user interaction with the search results.

\* \* \* \* \*